United States Patent Office 3,449,496

Patented June 10, 1969

3,449,496
COMPOSITIONS AND METHOD FOR TREATING HYPERTENSIVE PATIENTS COMPRISING HYDROCHLOROTHIAZIDE TRIAMTERENE AND RESERPINE

Alfred R. Maass, Swarthmore, and Murray G. Smyth, Jr., and Glenn E. Ullyot, Philadelphia, Pa., assignors to Smith Kline & French Laboratories, Philadelphia, Pa., a corporation of Pennsylvania No Drawing. Filed Dec. 8, 1965, Ser. No. 512,530
Int. Cl. A61k *27/00*
U.S. Cl. 424—246 6 Claims

ABSTRACT OF THE DISCLOSURE

Hypotensive compositions comprising a combination of a pteridine diuretic, a thiazide diuretic and a rauwolfia alkaloid having hypotensive activity, preferably a combination of triamterene, hydrochlorothiazide and reserpine, and method of treating hypertensive subjects by administering orally these compounds.

This invention relates to new hypotensive compositions and a method of treating hypertensive subjects.

The hypotensive compositions of this invention comprise, in dosage unit form, a combination of a pteridine diuretic, a thiazide diuretic and a rauwolfia alkaloid having hypotensive activity. A particularly advantageous combination of this invention comprises 2,4,7-triamino-6-phenylpteridine (triamterene), 6-chloro-7-sulfamoyl-3,4-dihydro-1,2,4-benzothiadiazine - 1,1 - dioxide (hydrochlorothiazide) and reserpine. The addition of triamterene to a hydrochlorothiazide-reserpine combination, which is a known hypotensive composition, is advantageous in that a greater reduction in blood pressure is achieved than is producd by the hydrochlorothiazide-reserpine combination alone. This is unexpected because triamterene alone has weak hypotensive activity, see for example (American Heart Journal 70:455–460, October 1965), although it has marked diuretic activity. The unexpected hypotensive effect of the combination of triamterene, hydrochlorothiazide and reserpine compared with the prior art combination of hydrochlorothiazide and reserpine is shown by the data in the following table obtained from tests using both combinations with appropriate placebo control periods in the same 18 patients:

DECREASE IN MEAN BLOOD PRESSURE[1] MM. HG (SYSTOLIC/DIASTOLIC)

| | Dose/day (mg.) | | Dose/day (mg.) |
|---|---|---|---|
| Hydrochlorothiazide | 50 | Hydrochlorothiazide | 50 |
| Reserpine | 0.25 | Reserpine | 0.25 |
| Triamterene | 100 | | |
| Supine | Erect | Supine | Erect |
| 41/18 | 47/24 | 20/14 | 20/15 |

[1] Expressed as difference between readings made during placebo period and during the time of drug treatment.

The remarkable enhancement of the blood pressure reduction using the three component combination of this invention compared with the two component combination of the prior art is evident from this data, in particular, from the difference in the systolic pressure réduction average.

In addition, the presence of triameterene in the combination is advantageous because it reduces or abolishes the risk of hypokalemia which is a side effect of thiazides and thus eliminates the need for potassium supplementation.

Most advantageously, the compositions of this invention comprise, in dosage unit form, triamterene, hydrochlorothiazide and reserpine combined with a nontoxic pharmaceutical carrier.

The pharmaceutical carrier may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly, the carrier or diluent may include a standard time delay material such as glyceryl monostearate or glyceryl distearate alone or mixed with a wax.

A wide variety of pharmaceutical forms can be employed. Thus, if a solid carrier is used, the preparation can be tableted, placed in a hard gelatin capsule or in the form of a troche or lozenge. The amount of solid carrier will vary widely but preferably will be from about 25 mg. to about 1 gm. If a liquid carrir is used, the preparation may be in the form of a soft gelatin capsule or a liquid supsension.

The hypotensive compositions of this invention will preferably be comprised of triamterene in an amount of from about 5 mg. to about 250 mg., advantageously from about 10 to about 100 mg., hydrochlorothiazide in an amount of from about 1 mg. to about 200 mg., preferably from about 2 mg. to about 100 mg. and reserpine in an amount of from about 0.05 to about 1 mg., preferably about 0.1 mg. to about 0.5 mg.

A particularly advantageous composition comprises, in dosage unit form, about 50 mg. of 2,4,7-triamino-6-phenylpteridine, about 25 mg. of hydrochlorothiazide and about 0.125 mg. of reserpine.

The method in accordance with this invention comprises administering orally to hypertensive subjects in an amount sufficient to produce hypotensive activity a composition, usually combined with a nontoxic pharmaceutical carrier, comprising a combination of a pteridine diuretic, preferably triamterene, a thiazide diuretic, preferably hydrochlorothiazide, and a rauwolfia alkaloid, preferably reserpine. The composition in dosage unit form as described above will be administered in a total daily dosage of from about 5 mg. to about 600 mg. of triamterene, from about 1 mg. to about 200 mg. of hydrochlorothiazide and from about 0.05 mg. to about 1 mg. of reserpine. Preferably, the total daily dose of the composition will comprise from about 5 mg. to about 400 mg. of triamterene, from about 2 mg. to about 150 mg. of hydrochlorothiazide and from about 0.1 mg. to about 0.5 mg. of reserpine. The composition as described is administered orally as a combination or by administering the ingredients separately but at the same time to the subjects. Advantageously, dosage units of the combination will be administered one to four times daily.

According to an advantageous method of this invention a composition comprising triamterene, hydrochlorothiazide and reserpine is administered in a total daily dosage of from about 50 mg. to about 200 mg. of triamterene, from about 25 mg. to about 100 mg. of hydrochlorothiazide and from about 0.125 to about 0.5 mg. of reserpine. The combination will preferably be administered in pharmaceutical forms as described hereabove. When the administration is carried out as described above, marked lowering of blood pressure with a minimum of side effects is achieved in hypertensive subjects.

Other pteridines which have diuretic and natruretic activity and which do not enhance potassium loss may be used in the compositions of this invention such as those described in the following patents: U.S. 3,081,230, 3,127,-403 and 3,210,356 and French 2206M.

Thiazide diuretics which may be used in the hypotensive compositions of this invention are exemplified by the following formulas:

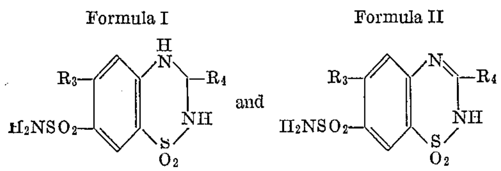

in which:

$R_3$ is fluoro, chloro or trifluoromethyl or the like and $R_4$ is hydrogen, benzyl, chloromethyl, dichloromethyl, 2,2,2-trifluoroethylthiomethyl, 5-norbornen-2-yl, benzylthiomethyl or the like.

Exemplary of such thiazide derivatives are chlorothiazide, hydrochlorothiazide, bendroflumethiazide, methyclothiazide, trichlormethiazide, polythiazide, flumethiazide, hydroflumethiazide, cyclothiazide and benzthiazide.

The amount of the thiazide in the compositions of this invention will depend upon the potency of said thiazide but will be usually in an amount of from about 0.5 mg. to about 750 mg., preferably about 1 mg. to about 500 mg. per unit dose of the composition. Total daily doses of thiazide will be from about 0.5 mg. to about 1000 mg., preferably from about 1 mg. to about 750 mg.

Other pure rauwolfia alkaloids, such as deserpidine, or rauwolfia preparations, such as alseroxylon, having hypotensive activity may be used in place of reserpine in the hypotensive compositions of this invention. Alternatively, the whole root of *Rauwolfia serpentina* in an amount of from about 25 to 150 mg. per unit dose of the composition may be used in place of reserpine in the compositions of this invention.

The following examples are not limiting but are illustrative of this invention.

EXAMPLE 1

| Ingredients: | Amounts, mg. |
|---|---|
| 2,4,7-triamino-6-phenylpteridine | 50 |
| Hydrochlorothiazide | 25 |
| Reserpine | 0.125 |
| Aminoacetic acid | 200 |
| α-Cellulose | 25 |
| Colloidal magnesium aluminum silicate | 50 |
| Starch | 30 |
| Polyvinylpyrrolidone (5% solution in alcohol-water 5:1) | 5 |
| Magnesium stearate | 2 |

The triamterene, hydrochlorothiazide, aminoacetic acid, α-cellulose, colloidal magnesium aluminum silicate (20 mg.) and starch (15 mg.) are mixed for 10 minutes in a mixer, then passed through a #20 screen and mixed for 10 minutes. Reserpine is passed through a micropulverizer using a 0.010 screen, then weighed and added in divided increments to the previously prepared mixture. The resulting mixture is mixed for 30 minutes, then granulated using a 5% solution of polyvinylpyrrolidone in a 5:1 mixture of alcohol and water. The wet granules are dried overnight at 120° F. then passed through a #14 screen. The magnesium stearate and the remainder of the colloidal magnesium aluminum silicate (30 mg.) and starch (15 mg.), which have previously been passed through a #40 screen, are added and the mixture is compressed into a tablet.

EXAMPLE 2

| Ingredients: | Amounts, mg. |
|---|---|
| 2,4,7-triamino-6-phenylpteridine | 50 |
| Hydrochlorothiazide | 50 |
| Reserpine | 0.125 |
| Calcium sulfate dihydrate | 100 |
| Sucrose | 15 |
| Starch | 10 |
| Talc | 5 |
| Stearic acid | 3 |

The sucrose, calcium sulfate dihydrate, 2,4,7-triamino-6-phenylpteridine and hydrochlorothiazide are mixed and granulated with hot 10% gelatin solution. The wetted mass is passed through a mesh screen onto drying trays. The granules are dried at 107° F. and passed through a mesh screen.

These granules are mixed with the starch, talc and stearic acid and passed through a mesh screen and are compressed into a tablet.

Two tablets per day are administered orally.

EXAMPLE 3

| Ingredients: | Amounts, mg. |
|---|---|
| 2,4,7-triamino-6-m-methoxyphenylpteridine | 250 |
| Chlorothiazide | 500 |
| Reserpine | 0.125 |
| Lactose | 100 |
| Magnesium stearate | 5 |

The above ingredients are mixed, milled, mixed again and filled into a hard gelatin capsule.

EXAMPLE 4

| Ingredients: | Amounts, mg. |
|---|---|
| 2,4,7-triamino-6-o-methylphenylpteridine | 50 |
| Cyclothiazide | 2 |
| Reserpine | 0.25 |
| Lactose | 150 |
| Magnesium stearate | 5 |

The ingredients are screened, mixed, milled and mixed again and filled into a hard gelatin capsule.

EXAMPLE 5

| Ingredients: | Amounts, mg. |
|---|---|
| 2,4,7-triamino-6-phenylpteridine | 50 |
| Hydroflumethiazide | 50 |
| Reserpine | 0.125 |
| Peanut oil | 200 |

The ingredients are mixed into a thick slurry and filled into a soft gelatin capsule.

EXAMPLE 6

| Ingredients: | Amounts, mg. |
|---|---|
| 2,4,7-triamino-6-phenylpteridine | 25 |
| Bendroflumethiazide | 4 |
| Reserpine | 0.2 |

With aminoacetic acid, α-cellulose, colloidal magnesium aluminum silicate, starch, polyvinylpyrrolidone solution and magnesium stearate in the amounts indicated in Example 1, the above ingredients are formed into a tablet by the procedure of Example 1.

EXAMPLE 7

| Ingredients: | Amounts, mg. |
|---|---|
| 2,4,7-triamino-6-phenylpteridine | 50 |
| Methyclothiazide | 5 |
| Deserpidine | 0.25 |
| Lactose | 100 |
| Magnesium stearate | 5 |

The above ingredients are mixde, milled, mixed again and filled into a hard gelatin capsule.

EXAMPLE 8

| Ingredients: | Amounts, mg. |
|---|---|
| 2,4,7-triamino-6-phenylpteridine | 100 |
| Flumethiazide | 400 |
| Reserpine | 0.125 |
| Lactose | 50 |
| Magnesium stearate | 3 |

The above ingredients are mixed and filled into a hard gelatin capsule.

EXAMPLE 9

| Ingredients: | Amounts, mg. |
|---|---|
| 2,4,7-triamino-6-phenylpteridine | 75 |
| Polythiazide | 2 |
| Reserpine | 0.25 |

With aminoacetic acid, α-cellulose, colloidal magnesium aluminum silicate, starch, polyvinylpyrrolidone solution and magnesium stearate in the amounts indicated in Example 1, the above ingredients are formed into a tablet by the procedure of Example 1.

EXAMPLE 10

| Ingredients: | Amounts, mg. |
|---|---|
| 2,4,6-triamino-7-phenylpteridine | 50 |
| Hydrochlorothiazide | 25 |
| Reserpine | 0.125 |
| Lactose | 100 |
| Magnesium stearate | 5 |

The above ingredients are mixed and filled into a hard gelatin capsule.

EXAMPLE 11

| Ingredients: | Amounts, mg. |
|---|---|
| 7-dimethylamino-2,4-bismethylamino-6-phenylpteridine | 75 |
| Hydrochlorothiazide | 25 |
| Reserpine | 0.125 |
| Lactose | 100 |
| Magnesium stearate | 5 |

The above ingredients are mixed and filled into a hard gelatin capsule.

EXAMPLE 12

| Ingredients: | Amounts, mg. |
|---|---|
| 4,7-diamino-2-dimethylamino-6-phenylpteridine | 150 |
| Hydrochlorothiazide | 50 |
| Reserpine | 1 |

With aminoacetic acid, α-cellulose, colloidal magnesium aluminum silicate, starch, polyvinylpyrrolidone solution and magnesium stearate in the amounts indicated in Example 1, the above ingredients are formed into a tablet by the procedure of Example 1.

EXAMPLE 13

| Ingredients: | Amounts, mg. |
|---|---|
| 2,4,7-triamino-6-p-fluorophenylpteridine | 125 |
| Hydrochlorothiazide | 25 |
| Reserpine | 0.1 |

With aminoacetic acid, α-cellulose, colloidal magnesium aluminum silicate, starch, polyvinylpyrrolidone solution and magnesium stearate in the amounts indicated in Example 1, the above ingredients are formed into a tablet by the procedure of Example 1.

EXAMPLE 14

| Ingredients: | Amounts, mg. |
|---|---|
| 2,4,7-triamino-6-furylpteridine | 100 |
| Hydrochlorothiazide | 50 |
| Reserpine | 0.125 |

With aminoacetic acid, α-cellulose, colloidal magnesium aluminum silicate, starch, polyvinylpyrrolidone solution and magnesium stearate in the amounts indicated in Example 1, the above ingredients are formed into a tablet by the procedure of Example 1.

What is claimed is:

1. A pharmaceutical dosage unit for oral administration to produce hypotensive activity comprising about 50 mg. of triamterene, about 25 mg. of hydrochlorothiazide and about 0.125 mg. of reserpine.

2. A dosage unit according to claim 1 in which said dosage unit is a tablet.

3. A dosage unit according to claim 1 in which said dosage unit is a capsule.

4. The method of treating hypertensive patients comprising administering orally to said patients a dosage unit comprising about 50 mg. of triamterene, about 25 mg. of hydrochlorothiazide and about 0.125 mg. of reserpine one to two times daily.

5. The method according to claim 4 in which said dosage unit is a tablet.

6. The method according to claim 4 in which said dosage unit is a capsule.

References Cited

Chem. Abst. (I), 61: 3577d (1964).
Chem. Abst. (II), 62: 16825a (1965).
Handbook of Pharmacology, cutting, p. 190 (1964).

ALBERT T. MEYERS, *Primary Examiner.*

A. J. FRIEDMAN, *Assistant Examiner.*

U.S. Cl. X.R.

424—251, 262